Jan. 29, 1929.
A. P. J. PINEL
1,700,376
LOCKING MECHANISM FOR THE STEERING WHEELS OF VEHICLES, ETC
Filed Jan. 7, 1926  3 Sheets-Sheet 1
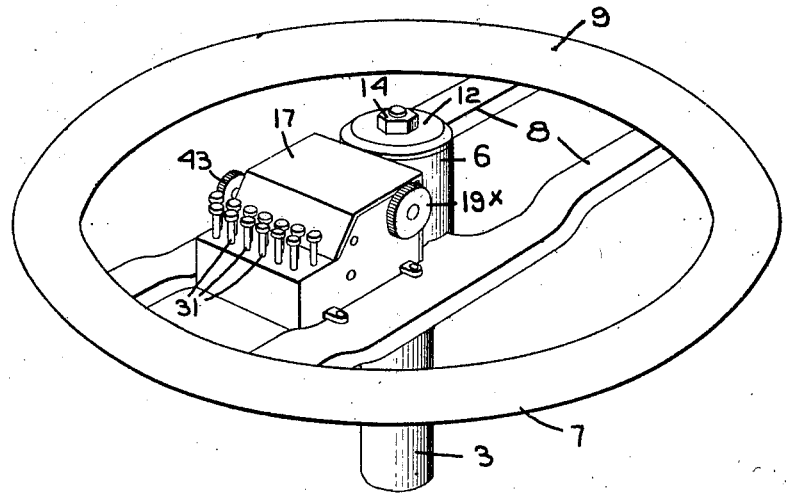
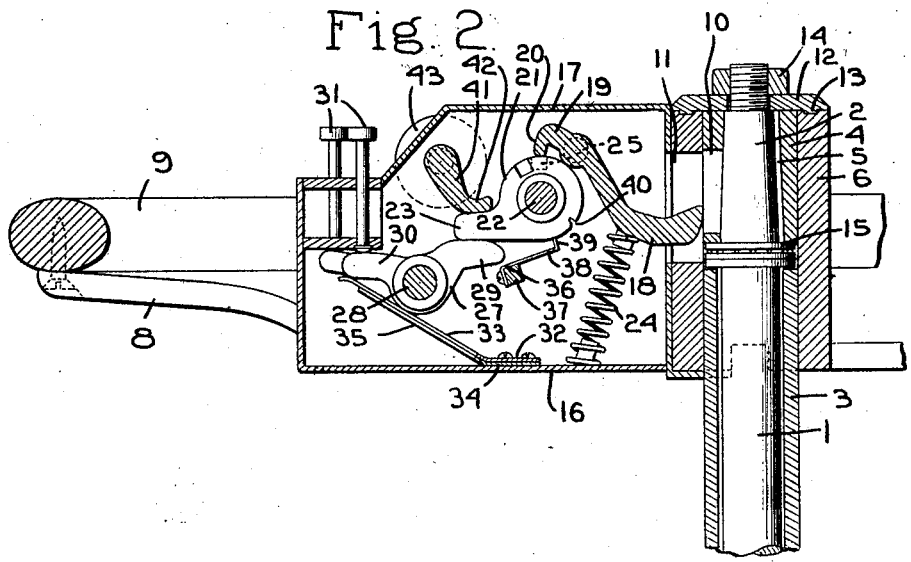
Inventor.
Alfred P. J. Pinel
by Heard Smith & Tennant.
Attys.

Jan. 29, 1929. 1,700,376
A. P. J. PINEL
LOCKING MECHANISM FOR THE STEERING WHEELS OF VEHICLES, ETC
Filed Jan. 7, 1926 3 Sheets-Sheet 2
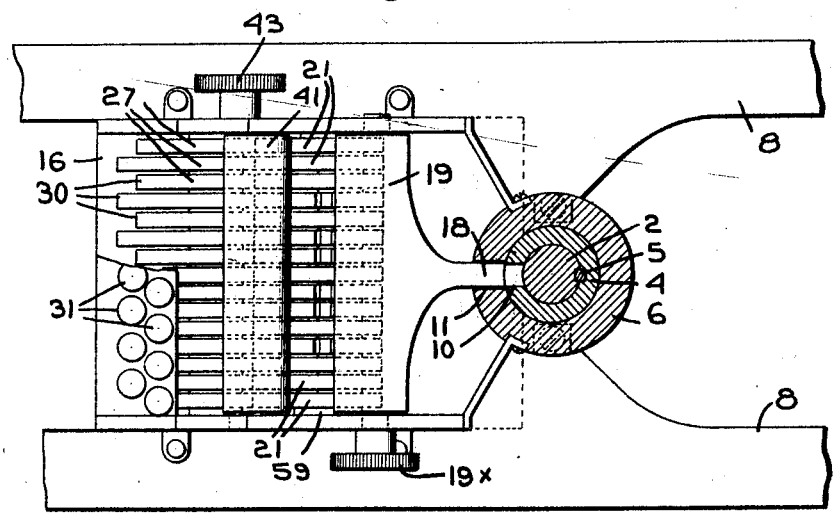
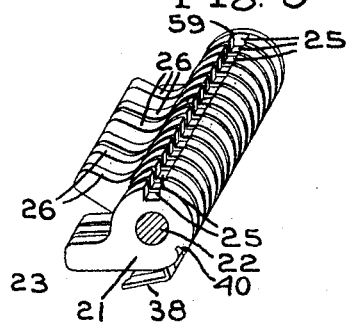
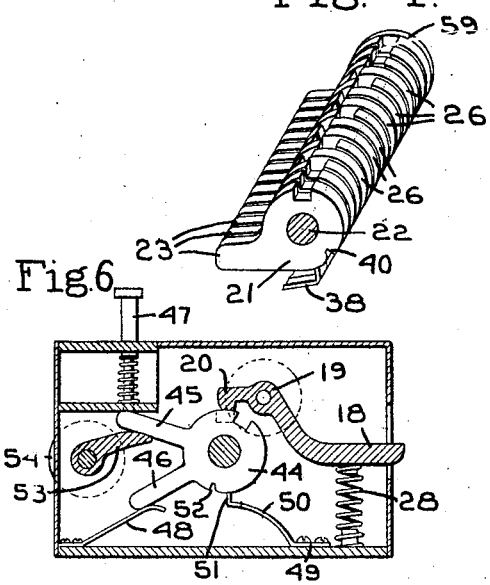
Inventor.
Alfred P. J. Pinel
by Heard Smith & Tennant.
Attys.

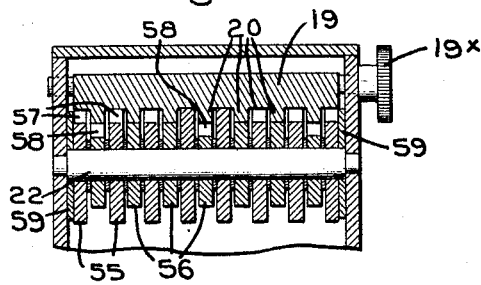
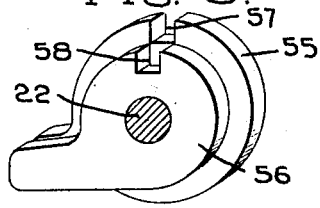
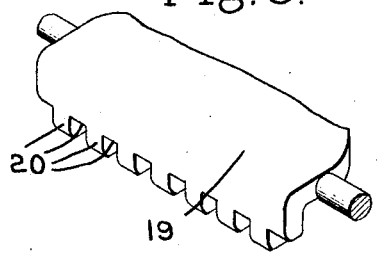
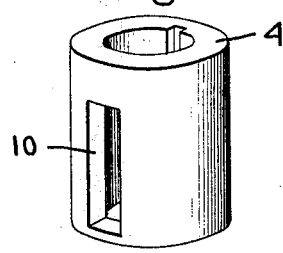

Patented Jan. 29, 1929.

1,700,376

UNITED STATES PATENT OFFICE.

ALFRED P. J. PINEL, OF QUINCY, MASSACHUSETTS.

LOCKING MECHANISM FOR THE STEERING WHEELS OF VEHICLES, ETC.

Application filed January 7, 1926. Serial No. 79,744.

This invention relates to improvements in mechanism for locking to the steering post of a vehicle, such as an automobile, a steering wheel which is rotatably mounted upon said post.

The principal object of the invention is to provide a locking device which can be quickly manipulated either to unlock the wheel from, or lock the same to, the steering post.

Another object of the invention is to provide a steering wheel construction which can be readily applied to any usual form of steering post and releasably locked thereupon.

A further object of the invention is to provide a combination lock so constructed as normally to prevent locking engagement between the steering wheel and the steering post, but operable upon the actuation of a predetermined group of actuators to permit or cause the lock effectively to secure the wheel to the steering post.

A further object of the invention is to provide a lock of the character described with means for latching, or otherwise retaining, a moved actuated controller member in actuated position until released by suitable restoring mechanism so that actuation of any controller, other than one of the combination group, will prevent locking engagement of the bolt.

A further object of the invention is to provide a plurality of key-actuated levers so constructed that after each key is actuated it will be restored to normal position, thereby presenting the same appearance as other keys of the series, thus increasing the difficulty of solving the combination.

A further object of the invention is to provide a combination lock of the character described with individually operable controllers so constructed that the members of the combination group may be operated, either singly, jointly, or in unison, whereby the operator will be enabled apparently to use different combinations to establish the required predetermined relation of the actuators.

A further object of the invention is to provide a series of controllers of different diameter having recesses adapted, when positioned in a predetermined relation, to receive a cooperating member upon the bolt and thereby to permit projection of the bolt into the slot, the radius of certain of the controllers being not greater than the radius of the bottom of the recesses of other controllers, whereby the combination cannot be solved by the insertion of a tool into alined recesses.

Other objects and features of the invention will more fully appear from the following description and the accompanying drawings and will be particularly pointed out in the claims.

In the drawings:

Fig. 1 is a perspective view of a steering post and the steering wheel applied thereto having a lock embodying the present invention;

Fig. 2 is a vertical sectional view through the lock and hub of the steering wheel and showing the steering post in elevation;

Fig. 3 is a plan view of the construction illustrated in Fig. 2, the cover of the lock being removed, and the steering post, the hub of the wheel and the sleeve intermediate thereof being shown in section;

Fig. 4 is a detail view in perspective of a preferred form of controller shown in normal position, with certain of the recesses of the controller members out of alinement and adapted to prevent the locking bolt from assuming locking position;

Fig. 5 is a similar view showing the recesses of the controller member in alinement and adapted to permit projection of the bolt into locking position;

Fig. 6 is a vertical sectional view of a different form of lock embodying the invention;

Fig. 7 is a vertical sectional view showing controller members of different diameter together with the co-operating interengaging means of the bolt and illustrating the relative positions thereof when the bolt is in unlocked position and the wheel free to rotate;

Fig. 8 is a perspective view of a pair of associated controller members like those illustrated in Fig. 7, in which the radius of the smaller member is not greater than the radius of the bottom of the slot in the larger member;

Fig. 9 is a perspective view of the end portion of the bolt showing means adapted to engage in the respective controller slots; and, Fig. 10 is a perspective view of an adapter sleeve which may be differently constructed to permit a steering wheel of the character described to be applied to the steering posts of vehicles of different makes.

The invention relates to steering mechanisms for vehicles in which the wheel is rotatably mounted upon the steering post of a vehicle and is provided with locking mechanism by means of which it can be rigidly secured to the steering post when the vehicle is in use, and readily unlocked by the driver when the vehicle is not in use as when the vehicle is parked, or placed in a garage.

One of the objects of the invention is to provide mechanism which will permit a steering wheel of this character to be applied to the steering post of any usual vehicle.

Another object of the invention is to provide means which can be quickly manipulated either to lock or to unlock the wheel from the steering post.

In the preferred embodiment of the invention illustrated herein a steering post 1 having a tapered upper end 2 is shown, the body of the steering post being enclosed in the usual tubular standard 3. The tapered portion of the steering post is surrounded by an adapter in the form of a sleeve 4 which may be made of any suitable taper to fit upon the steering post and secured thereto by a key 5. The outer surface of the adapter sleeve 4 is of cylindrical form and adapted rotatably to fit within the hub 6 of the wheel 7. The hub of the wheel desirably is made integral with a frame comprising members 8, the ends of which are suitably secured to the usual annular hand grip or rim 9. The sleeve is provided with a bolt-receiving slot 10 and the hub with a recess 11 adapted to register therewith so that a bolt inserted through the recess 11 and into the slot 10 will rigidly secure the sleeve and hub together. Preferably the slot 10 in the adapter is slightly tapered from the bottom toward the top and the end of the bolt correspondingly tapered so as to fit tightly therein when in locking position and thereby prevent vibration, the width of the bolt being such, however, that it may never reach the upper end of the slot. This construction also serves to permit a quick release when the bolt is swung downwardly. The hub 6 desirably is provided with a cap 12 having near its periphery a rib 13 adapted to enter a complementary groove in the top of the hub and a suitable fastening device such as a nut 14 upon the screw threaded extension of the steering post serves to hold the hub in position. Desirably a ball bearing 15 is interposed between the lower end of the adapter sleeve 4 and the upper end of the tubular sleeve which surrounds the steering post to enable the steering mechanism to be manipulated more easily.

It will be obvious that if the cap 12 of the hub is removed and the wheel taken from the steering post no means will remain which will enable an unauthorized person to steer the car.

The wheel is provided with a lock which preferably is controlled by a suitable combination adapted to permit engagement of the bolt of the lock with the slot 10 of the steering post sleeve only when the combination is properly set.

It will be understood that the invention is illustrated herein as comprising an automobile wheel hub and sleeve adapted to be applied to the steering posts of usual types of vehicles and that if the locking mechanism is constructed to form a part of the original installation of the vehicle the adapter sleeve may be omitted and that the centering post itself may be slotted and made of suitable size and form to fit the hub of the vehicle.

The preferred locking mechanism which is illustrated herein comprises a casing having a lower portion 16 which may be riveted to, or made integral with, the frame 8 and a cover 17 so constructed and secured to the casing as to prevent the insertion of a tool by means of which it might otherwise be separated therefrom. The locking mechanism comprises a bolt 18 the free end of which desirably extends into the recess 11 of the hub and is adapted to be projected into the slot 10 of the adapter sleeve or steering post when the recess 11 is in alinement therewith. The bolt 18, as illustrated herein, is of curved form and is provided with a wide controller-engaging end 19 provided with laterally extending journals which are pivotally mounted in suitable bearings in the wall of the casing. One of the journals extends through the casing and is provided with a preferably milled hand-wheel 19× by means of which the bolt may be swung pivotally out of locking position to permit the slots in the controlling members to be thrown out of registry as will hereinafter more fully appear. In the particular construction illustrated the controller-engaging end 19 of the bolt 18 is provided with a rib or series of ribs 20 adapted to enter suitably positioned recesses in a series of movable, preferably rotatable, controller members.

The controller members shown in the drawings comprise a series of substantially cylindrical or arcuate members 21 which are rotatably mounted upon a shaft 22 journalled at its ends in the casing. The members 21 desirably are separated by suitable spacing washers to insure independent action. Each of the rotatable members is provided with an arm 23 adapted to be engaged by a suitable actuator. Each of the rotatable members is provided with a slot adapted to receive the rib 20 of the bolt and, as shown in Fig. 5, are adapted when arranged in alinement to permit the rib 20 to enter and thereby to permit the bolt 18 to be swung upwardly into engagement with the slot 10 of the adapter sleeve or steering post. The outer wall of the rib or ribs 20 should be made in the form of an arc having a center coincident with the axis of the fulcrum of the bolt 18 so that the ribs may readily enter the recesses and seat firmly therein. A spring 24 interposed between the bolt and the casing, tends normally to project the bolt into locking position. This spring is shown as a compression spring, but obviously a tension spring might be employed, or the locking bolt so counterweighted or otherwise constructed as normally to tend to move to locking position.

Certain recesses 25 of the series of controller members are so arranged that when the controller members are in normal position the recesses will be in alinement, or such other position as to permit the entrance of the rib 20 of the locking bolt. Other members 26 of the series are provided with grooves which, when the controller members are in normal position, are out of alinement with the recesses 25 as illustrated in Fig. 4, and thereby prevent the entrance of the rib or ribs 20 into such recesses, but are adapted to be moved into alinement, as illustrated in Fig. 5, or other predetermined relative position to receive the ribs 20 and thereby to permit locking movement of the bolt.

Any suitable means may be provided for actuating the controller members. As illustrated in Fig. 2, a series of actuator levers 27 are shown as rotatably mounted upon a shaft 28, one end 29 of each lever underlying the arm 23 of a controller member, while the opposite arm 30 of each lever lies beneath the stem of a key 31. Two banks of keys are illustrated in Fig. 2, but it will be understood that any number of banks may be employed by properly proportioning the levers 27. Suitable springs are provided to hold the keys in normal position. A convenient form of spring, which is illustrated herein, comprises a sheet of spring steel having a base 32 riveted, or otherwise secured, to the bottom of the casing and slitted to provide tongues 33 underlying and engaging each of the arms 30. A similar spring plate 34 having tongues 35 underlying the tongues 33 may be employed to provide stiffer springs for the actuating levers if so desired.

Suitable means desirably are provided for latching each actuator lever as it is moved to actuating position. A convenient mechanism for accomplishing this purpose comprises a steel plate 36 suitably mounted upon a bar 37 secured to the casing and provided with tongues 38 having offset or hooked ends 39 adapted to enter respective recesses 40 in the controller members then actuated. Each of the controller members is adapted, therefore, to be latched when it has been actuated so that if only the proper combination is operated the recesses of all the controller members will be held in a predetermined established relation to permit the entrance of the rib or ribs of the locking bolt, whereas if any controller member not of the proper combination is actuated it will be held in actuated position and will prevent the entrance of the rib or ribs of the locking bolt into the series of recesses, so that the proper combination cannot be effectively actuated to establish the required relation until the actuator levers have been reset to normal position.

Any suitable means may be employed for resetting the controller members to normal position. As illustrated herein the restoring member comprises an arm 41 having a curved end 42 adapted to engage the upper faces of the arms 23 of the controller members, the arm 41 having trunnions rotatably mounted in the casing and provided with a handle or milled disk 43 by means of which it can be readily manipulated. Obviously the rotation of the arm 41 through the handle or disk 43 in a clockwise direction, as illustrated in Fig. 2, will depress the arms 23 of the controller members to the normal position illustrated therein, while depression of any of the keys 31 will rock the levers 27 about the shaft 28 raising the arm 23 of the controller member thus actuated and thereby rotating the arm 42 of the restoring member in a counter-clockwise direction.

Desirably frictional means may be provided for retaining the restoring member in elevated position although the action of the springs 33 upon the actuating levers or the locking engagement between the latch 39 and notch 40 of the actuated controller member will serve to hold the restoring member in elevated position until depressed by rotation of the disk 43. Each of the keys will be restored to normal position immediately after it has been depressed by the operator and released so that the keys will all present the usual appearance. Unless close observation is made the manipulation of the proper combination keys by the operator may not be detected.

By reason of the fact that each of the controller members is actuated by its own independent actuator, the proper combination keys may be depressed in any sequence, or two or more jointly, or all of the combination members depressed in unison so that the operator of the vehicle may manipulate the proper combination in a number of ways, thus further avoiding detection of the proper combination. If any key not a member of the proper combination is actuated inadvertently or otherwise the controller member actuated thereby will be locked in actuated position and the movement of the locking bolt into operative locking position prevented until all of the controller members have been restored to normal position and the proper combination keys only actuated. Furthermore, failure to operate any of the combination keys will effectively prevent movement of the locking bolt into locking position as will be readily understood.

In Fig. 6 a different form of actuating mechanism is illustrated. In this construction each controller member 44 is provided with two arms 45 and 46, the arm 45 being engaged by a spring-actuated key 47, while the arm 46 is acted upon by a lifting spring 48 tending to hold the actuator in normal position. A suitable latching spring 49, having tongues 50 provided with offset ends 51 to engage notches 52 in the controller member, is provided to lock the controller members in actuated position. The restoring member comprises an arm 53 which engages the under face of the arms 45 and is pivotally mounted in the casing and provided with a disk or handle 54 by means of which it may be manipulated. In the operation of this device the depression of the respective keys serves to actuate the controller members in the manner above set forth. When actuated the controller members are held in actuated position by the latching member 50 and are restored to normal position by counter-clockwise rotation of the restoring member 53 as will be obvious.

As it is more convenient to arrange the series of recesses in the controlling members in alinement when in proper registering relation with a tongue upon the locking bolt, it may be desirable that the controlling members shall be made of such different diameters that certain of the members will not have a greater radius than the bottom of the slots of the other members so that the combination cannot be solved by merely drilling through the wall of the casing and thereafter inserting a feeling tool to determine when the recesses of the actuators are in alinement. A construction to obviate such picking of the combination lock is illustrated in Figs. 7 and 8 in which certain of the controller members 55 are of large diameter and other controller members 56 of such smaller diameter that the radii of their peripheries is not greater than the radius of the bottom of the slots 57 in the members 55. The slots 58 of the members of lesser diameter may be of any suitable depth and the ribs of the locking bolt may be made complementary to the depth of the respective recesses 57 and 58 as is illustrated in Fig. 9. Other means may be provided to prevent the picking of the lock, such for example, as interposing hardened steel washers 59 between the walls of the lock and the ends of the series of actuators.

It will be understood that various modifications in form, construction and arrangement of parts of the mechanism herein disclosed may be made within the spirit and scope of the following claims.

In the operation of the device the combination keys may be depressed in any sequence, or jointly, or in unison to bring the slots of the controller members into alinement or into such predetermined position as will permit the rib or ribs 20 of the bolt to enter the positioned slots. The spring, which acts upon the bolt, will then force the bolt into locking engagement with the adapter sleeve or with the steering post as the case may be. When the wheel is thus locked to the steering post the vehicle can be steered in the usual manner. When the vehicle is to be parked or placed in a garage the hand-wheel $19^x$ of the bolt is rotated to depress the bolt, against the pressure of its spring, out of engagement with the slot in the adapter or steering post and the disk 43 of the re-setting mechanism may then be rotated to depress the arms 23 of the controller members into alinement thereby throwing the slots of the controllers out of alinement so that the ribs 20 of the bolt will rest upon the peripheries of the controller members and the bolt will be prevented from again entering the slot of the adapter or steering post until the proper combination keys have been again depressed. Thus the steering wheel is freed from its engagement with the shaft and will spin around upon the same.

By reason of the fact that the bolt is thus locked by the controller members so that it cannot enter the slot in the adapter or in the steering post it will be impossible to steer the vehicle. In other words, the manipulation of the proper combination is necessary to permit or to cause locking engagement with the steering post while unlocking and retention of the bolt in inoperative position is accomplished quickly by the mere manipulation of the hand-wheel $19^x$ and the disk 43 of the restoring device. Furthermore, the construction is such that no connection can be made between the wheel and the steering post in any other manner than through the manipulation of a combination.

Having thus described the invention, what is claimed as new, and desired to be secured by Letters Patent, is:

1. A lock for rigidly securing together the steering post of a vehicle and a steering wheel rotatably mounted thereon, with registerable bolt-receiving slots in said post and wheel comprising a combination lock mounted on said wheel having a pivotally mounted spring-actuated locking bolt and a series of relatively movable controller members therefor having individual actuators and including a combination group the members of which are operable in any sequence or simultaneously and once only to establish a predetermined relation adapted to permit effective locking movement of said bolt.

2. A lock for rigidly securing together the steering post of a vehicle and a steering wheel rotatably mounted thereon, with registerable bolt-receiving slots in said post and wheel comprising a combination lock mounted on said wheel having a spring-actuated bolt and a series of relatively movable controller members therefor having individual actuators and including a combination group operable in any sequence or simultaneously to establish a predetermined relation adapted to permit effective locking movement of said bolt, manually operable means for withdrawing and withholding said bolt from locking position and separately operable means for destroying the predetermined relation of the controller members thereby preventing effective locking movement of said bolt, whereby free rotation of the wheel upon said post will be insured.

3. A lock for rigidly securing together the steering post of a vehicle and a steering wheel rotatably mounted thereon, with registerable tapered bolt-receiving slots in said post and wheel comprising a lock mounted upon said wheel having a swinging spring-actuated bolt tending to enter the slot in said sleeve and to swing toward the narrow end of said slot thereby effecting a tight but readily releasable engagement with the walls of said slot and bolt-controlling combination having means operable to permit said bolt to enter said slot.

4. A lock for rigidly securing together the steering post of a vehicle and a steering wheel rotatably mounted thereon, with registerable tapered bolt-receiving slots in said post and wheel comprising a lock mounted upon said wheel having a swinging spring-actuated bolt tending to enter the slot in said sleeve and to swing toward the narrow end of said slot thereby effecting a tight but readily releasable engagement with the walls of said slot and bolt-controlling combination having means operable to permit said bolt to enter said slot, means for withdrawing said bolt from locking position and means operable thereupon to destroy said combination and thereby prevent effective locking action until re-establishment of said combination.

5. A lock for rigidly securing together the steering post of a vehicle and a steering wheel rotatably mounted thereon, with registerable bolt-receiving slots in said post and wheel comprising a combination lock for rigidly securing said wheel hub to said post comprising a spring-actuated bolt tending normally to engage said slots and a controller therefor composed of a series of relatively movable members having means to interengage with a complementary member upon said bolt when in a predetermined relation and thereupon to permit effective locking movement of said bolt, the interengaging members of a combination group thereof being normally unsymmetrically disposed with respect to said predetermined relation and an actuator for each controller member whereby the controller members of said group may be actuated either successively, jointly, or simultaneously, to establish said predetermined relation while the movement of any other controller will prevent establishment of such relation.

6. A lock for rigidly securing together the steering post of a vehicle and a steering wheel rotatably mounted thereon, with registerable bolt-receiving slots in said post and wheel comprising a combination lock for rigidly securing said wheel hub to said post comprising a spring-actuated bolt tending normally to engage said slots and a controller therefor composed of a series of relatively movable members having means to interengage with a complementary member upon said bolt when in a predetermined relation and thereupon to permit effective locking movement of said bolt, the interengaging members of a combination group thereof being normally unsymmetrically disposed with respect to said predetermined relation and an actuator for each controller member whereby the controller members of said group may be actuated either successively, jointly, or simultaneously, to establish said predetermined relation while the movement of any other controller will prevent establishment of such relation, means for simultaneously restoring the actuated controller members to normal position and means retaining each actuated member in actuated position until actuated by said restoring means.

7. A lock for rigidly securing together the steering post of a vehicle and the steering wheel rotatably mounted thereon having registerable bolt-receiving slots comprising a lock secured to said wheel having a bolt tending normally to enter said slots, a controller for said bolt having a series of individually rotatable members, an actuator for each of said rotatable members, interengaging means upon said bolt and the respective members operable when interengaged to permit said bolt to enter said slot, means normally retaining the interengaging means of a combination group of controlling members out of interengaging relation, whereby actuation only of the members of said group will permit effective interengagement of all of the several interengaging means, means for simultaneously restoring said actuated members to normal position and latching means for retaining each actuated member in actuated position until return to normal position by said restoring means.

8. A lock for rigidly securing together the steering post of a vehicle and the steering wheel rotatably mounted thereon having registerable bolt-receiving slots comprising a lock secured to said wheel having a bolt tending normally to enter said slots, a controller for said bolt having a series of individually rotatable members, an actuator for each of said rotatable members, interengaging means upon said bolt and the respective members operable when interengaged to permit said bolt to enter said slot, means normally retaining the interengaging means of a combination group of controlling members out of interengaging relation, whereby actuation only of the member of said group will permit effective interengagement of all of the several interengaging means, means for simultaneously restoring said actuated members to normal position, latching means for retaining each actuated member in actuated position until return to normal position by said restoring means and latching means for retaining said members in normal position.

9. A lock for rigidly securing together the steering post of a vehicle and the steering wheel rotatably mounted thereon having registerable bolt-receiving slots comprising a pivotally mounted bolt tending normally to engage said slot, a controller therefor having a series of rotatable members each presenting an arcuate surface provided with a recess, the recesses of a certain combination group of controller members being differently positioned from those of the remainder of the series, means on said bolt adapted to enter all of said recesses when the latter are in a predetermined relation and thereby to permit the bolt to enter said slots and actuators for the respective controller members operable only when the members of said combination groups are actuated to establish said predetermined relation.

10. A lock for rigidly securing together the steering post of a vehicle and the steering wheel rotatably mounted thereon having registerable bolt-receiving slots comprising a pivotally mounted bolt tending normally to enter said slots, a controller therefor having a series of pivotally mounted members each of which presents an actuating arm and an arcuate surface provided with a recess, the recesses of a certain combination group of controller members being differently positioned from those of the remainder of the series, a rib on said bolt adapted to enter all of the recesses of said controller members when the latter are in alinement and thereby to permit said bolt to enter said slots, key-actuated levers engaging the respective arms of the controller members, springs for said key-actuated levers acting to hold the same in normal position and latching means operable to retain the actuated controller members in actuated position, whereby each actuated key will be restored to normal position after actuation and present a like appearance to other key-actuated levers.

11. A lock for rigidly securing together the steering post of a vehicle and the steering wheel rotatably mounted thereon having registerable bolt-receiving slots comprising a pivotally mounted bolt, a controller therefor having a series of rotatable members presenting arcuate surfaces, certain of said rotatable members having a radius not greater than the radius of the bottom of the recesses of other members, means on said bolt adapted to enter all of the recesses of said controller members when the latter are in a predetermined relation and means operable thereupon to project said bolt into the slot in said steering post, the recesses of a certain combination group of controller members being differently positioned from those of the remainder of the series, actuators for the respective controller members operable when only the members of said combination group are actuated to establish said predetermined relation of said recesses, whereby movement of any other actuator of said series will prevent engagement of said bolt with said slot.

In testimony whereof, I have signed my name to this specification.

ALFRED P. J. PINEL.